United States Patent

Kokura et al.

[11] 3,825,716
[45] July 23, 1974

[54] ELECTROSLAG WELDING METHOD

[75] Inventors: Satoshi Kokura; Genzi Taki; Kiyoshi Watanabe, all of Hitachi, Japan

[73] Assignee: Hitachi, Ltd., Tokyo, Japan

[22] Filed: Sept. 29, 1972

[21] Appl. No.: 293,510

[52] U.S. Cl.................. 219/73, 219/126, 219/137
[51] Int. Cl........................................... B23k 25/00
[58] Field of Search..................... 219/73, 126, 137

[56] References Cited
UNITED STATES PATENTS

| | | | |
|---|---|---|---|
| 3,585,343 | 6/1971 | Crichton | 219/73 |
| 3,643,056 | 2/1972 | Wright et al. | 219/73 |
| 3,665,143 | 5/1972 | Ujiie | 219/73 |

FOREIGN PATENTS OR APPLICATIONS

| | | | |
|---|---|---|---|
| 408,747 | 3/1968 | Australia | 219/73 |

*Primary Examiner*—C. L. Albritton
*Attorney, Agent, or Firm*—Craig & Antonelli

[57] ABSTRACT

An electroslag welding method utilizing, as its heat source, the resistance heat created in a molten slag during passage of current therethrough, in which a consumable guide is disposed in an opening that is, the groove defined by parent metals for guiding a welding electrode and fixed relatively centrally of groove by means of solid pieces of a flux so as to preclude electric shorting occurring between guide and the groove faces of said parent metals, and then a welding electrode in the form of a ribbon is fed through said consumable guide from a reel of said welding electrode.

13 Claims, 13 Drawing Figures cm cm

ELECTROSLAG WELDING METHOD

This invention relates to an improved electroslag welding method.

Welding methods utilizing, as the heat source, the resistance heat created in a molten slag during passage of current therethrough, includes an electroslag welding method.

This electroslag welding method is attracting the attention in the art of welding as having an epoch-making effect for the welding of large thickness steel plates or large size casting and forgings.

The electroslag welding method is carried out vertically upwardly because of its principle and the nature of the welding operation, and therefore, is applied to the formation of a welded joint extending vertically or substantially vertically.

The welding operation is completely automatized. In carrying out the welding operation, the parent metals to be welded together are arranged vertically in opposed relation to each other, with a groove interval of about 30 mm, and water-cooled copper plates are applied from both sides of the groove, which are slidingly moved upward as the welding operation proceeds. A suitable amount of flux is placed in the space defined by the groove faces of the parent metals and the water-cooled copper plates. A welding electrode which will form a deposited metals is fed from the upper side of the groove by automatic feeding means.

First of all, an arc is formed by this welding electrode to melt the flux by the heat of said arc and is extinguished at the point when a sufficient slag pool has been formed. Thereafter, the welding electrode and the groove faces of the parent metals are melted continuously at the rate optimum to achieve welding, by the resistance heat generated by the current passing from the welding electrode to the parent metals through the molten slag and the resultant molten metal moves upward while carrying the molten slag layer on top thereof, while gradually cooling from the bottom thereof. Thus, the welding proceeds slowly vertically upwardly.

Recently, however, excessive melting of the parent metals has become a problem in this type of electroslag welding. Namely, in the electroslag welding the amount of heat transferred to the parent metals is extremely large and accordingly the weld penetration in the parent metals becomes large. It has been revealed that this excessive weld penetration has an adverse affect on the mechanical properties of the weld zone and induces deformation of the parent metals.

In order to reduce the weld penetration in the parent metals, the groove formed between the parent metals must be reduced in width.

However, in the electroslag welding a wire is normally used as the welding electrode and the cross sectional area thereof cannot be reduced to smaller than a certain size because the wire must pass therein an amount of welding current sufficient to melt the groove faces of the parent metals. The diameter of the wire presently in use is about 3 mm. at smallest and, in order to feed this wire smoothly to the groove faces of the parent metals, the wire must be passed through a consumable guide, and furthermore, in order to prevent the wire from being electrically shorted with the groove faces of the parent metals, a substantial distance must be maintained between the wire and the groove faces. Therefore, the width of the groove must be at least 25 mm.

The grain size of the deposited metal becomes larger, and the mechanical strengths and impact value thereof become lower, the weld penetration increases. Further, the amount of contraction of the weld zone also becomes large, tending to cause deformation of the parent metals.

It is, therefore, an important subject in the electroslag welding to establish a welding method which enables the groove width to be reduced.

The primary object of the present invention is to provide an electroslag welding method which enables the groove width to be reduced.

Another object of the invention is to provide an electroslag welding method which enables the feeding of a welding electrode to be achieved with high accuracy.

Still another object of the invention is to provide an electroslag welding method which enables a uniform weld penetration to be obtained over the entire width of the parent metals.

A further object of the invention is to provide the most practical method of reducing the groove width in the electroslag welding.

According to the present invention there is provided an electroslag welding method utilizing, as the heat source, the resistance heat generated in a molten slag during passage of current therethrough, characterized in that a welding electrode in the form of a ribbon wound on a reel is fed through a consumable guide which is fixed relatively centrally of the groove between parent metals by solid pieces of a flux.

A welding electrode used in the electroslag welding cannot be made extremely small in its cross section since it is required to pass an amount of current sufficient to melt the groove faces of parent metals, and for this reason, the groove between the parent metals tends to become large. However, with a welding electrode in the form of a thin ribbon, it is possible to reduce the groove while maintaining the cross sectional area of the electrode at a necessary value.

In the present invention, use is made of a welding electrode in the form of a ribbon which has a thickness small enough to be wound on a reel and said welding electrode is fed to the groove faces of parent metals from said reel. Since the welding electrode is fed from the reel, the length thereof is not subjected to limitation and the use of a complicated feeding mechanism can be avoided.

The welding electrode is required to be fed to a point relatively centrally of the groove, because otherwise the current would pass not only in the molten slag but also to the groove face of the parent metal closer to said welding electrode or non-uniform temperature distribution would result in the molten slag, which in turn would result in a substantial difference in weld penetration between the parent metals.

Where the welding electrode is in the form of a thin ribbon, much difficulty is encountered in feeding stably the welding electrode deep into the groove, and this is more so in the present invention in which it is intended to reduce the groove width. In addition, since the welding electrode is fed from the reel, it has a curling nature and it is almost impossible to prevent completely electric shorting between the welding electrode and the groove face of the parent metal, even when such curling nature is cured by rolls during feeding of the electrode.

In the present invention, a guide is used to facilitate the feeding of the thin ribbon-like welding electrode. This guide has a shape to enclose the welding electrode and is disposed in the groove between the parent metals. The guide should be of a consumbale type made of a material which will be melted by the heat of the slag. If the guide is not consumable, it will have to be pulled upward as the welding proceeds and hence a device will be needed for this purpose. In addition, the nonconsumable guide will become complicated in construction as it must be cooled with water so as not to be melted.

No consideration need to be given to these matters when the consumable welding electrode is used.

While the guide can be made by molding the flux with pressure which will be a constituent of the slag, it is preferable to make the guide of a material which will be a constituent of the deposited metal, and the welding current should be passed also in said guide throughout the welding operation. This is advantageous in enhancing the operational efficiency because the value of current passing in the molten slag can be made high.

The welding electrode strikes the inner surface of the guide during its travel through said guide and the guide is occasionally caused to be displaced from the center of the groove by the impact force. To avoid the displacement, the consumable guide is fixed in the groove at several locations. Solid pieces of the flux should be used for fixing the guide in position, so that they may subsequently be melted to form part of the molten slag. The purpose of fixing the consumable guide can be attained simply by bonding these solid pieces to said guide or the groove faces of parent metals by means of an adhesive.

According to the present invention, the groove can be reduced to about 10 mm. Reduction of the groove width to smaller than 10 mm. has no practical significance because electric shorting will occur between the welding electrode and the groove face of parent metal.

In the conventional methods, a groove width of 30 mm. has been the limit of width reduction, and in this view the method of this invention enables the groove to be reduced as much as 20 mm.

Therefore, the following effects can be expected from the present invention:

1. The consumption of the welding electrode can be drastically reduced.
2. The welding rate can be increased.
3. The grain size of the deposited metal can be reduced and hence the mechanical properties thereof can be improved.
4. The deformation of the parent metals can be reduced to a minimum.
5. The width of the parent metal, which undergoes the influence of welding heat, can be minimized.

In addition to the above, the following effect can be expected from the use of the ribbon-like welding electrode:

Namely, in the conventional electroslag welding method using a wire electrode it has been impossible to obtain a uniform weld penetration over the entire plate thickness of parent metals, but with the ribbon-like electrode, it is possible to heat uniformly the entire groove face of parent metal and hence to obtain a uniform weld penetration.

In the electroslag welding, the deposited metal formed at the start of welding is poor in penetration because the heat of the slag is insufficiently high. Therefore, it has been a common practice to attach to the bottom of parent metals a tub made of the same material as the parent metals and having a groove formed therein, to form the initial deposited metal in said groove and to cut and remove the initially formed deposited metal upon completion of the welding. Should the deposited metal portion only be required to be cut off or should the tub be of a detachable type, the cutting operation subsequent to welding would be facilitated. In this view, the present invention proposes to make the tub from a water-cooled copper plate.

In order to cause a uniform depth of weld penetration over the entire plate thickness of the parent metals, it is only necessary to make the plate width of the ribbon-like welding electrode equal to the plate thickness of the parent metals. In the event when the plate thickness of the parent metals is extremely large, this can be dealt with simply by joining a plurality of the consumable guides to obtain a width equal to the plate thickness of the parent metals.

Figure 1:
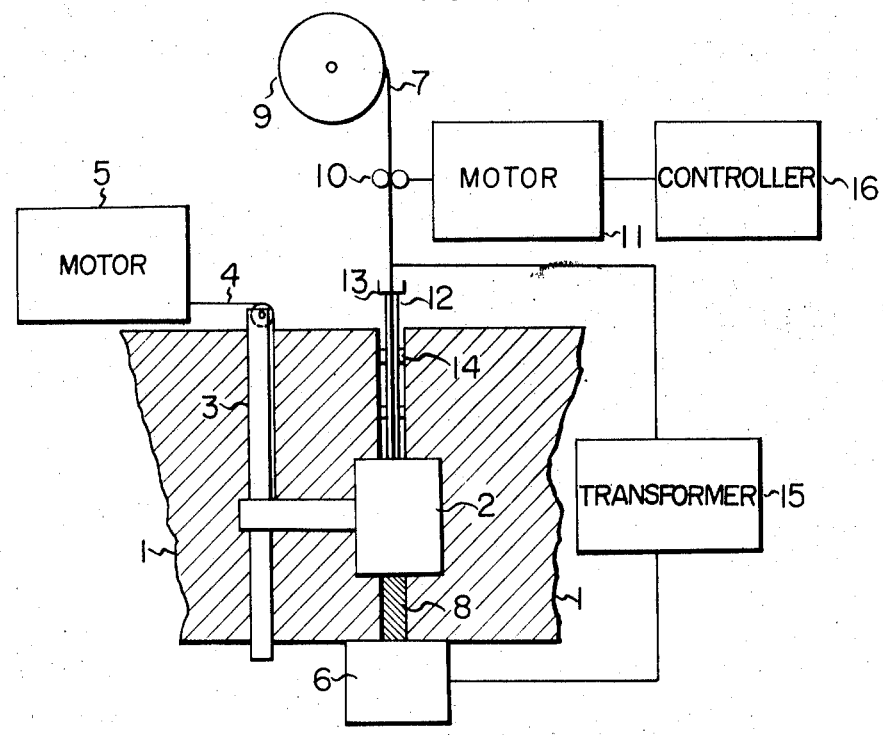
FIG. 1 is a diagrammatic view illustrating the manner of practicing the present invention.

Referring to FIG. 1 which illustrates the manner of practicing the present invention, parent metals 1 are arranged in opposed relation to each other in a manner to define a vertically extending groove therebetween and copper plates 2 are attached to both sides of said groove. These copper plates 2 are provided for the purpose of confining a slag and molten metal in the groove and are each of a water-cooled structure. The copper plates 2 may be hoisted as the welding proceeds, or may alternatively be attached over the entire length of the groove to avoid such hoisting operation.

In the method shown in FIG. 1, there is employed a mechanism for hoisting the copper plates 2 as the welding proceeds. Namely, the arrangement is made such that the copper plates 2 move upwardly sliding on guide rails 3 connected to the parent metal 1. Hoisting of the copper plates 2 is effected by wires 4 which are wound up by a motor 5. The rotational speed of the motor 5 is regulated so as to be substantially equal to the rate of welding.

Penetration of the deposited metal formed at the initial stage of the welding operation is relatively poor due to insufficient slag heat. Therefore, the molten metal obtained in the initial stage of the welding operation is deposited in a tab 6 which is connected to the bottom end of the groove by welding. This deposited metal is cut off from the weld zone, together with the tub, upon completion of the welding. The welding operation is commenced by feeding a welding electrode 7 into the groove from the upper side thereof, with a flux previously charged in said groove, and forming an arc across the lower end of said welding electrode 7 and the tab or parent metals 1. Once the flux has been melted by the heat of the arc and a slag has been formed, the arc is extinguished and thereafter the current is only passed in the slag. The molten slag generates a high Joule heat during passage of the current therethrough which flows from the welding electrode to the parent metals or tub. By this heat, the welding electrode and the groove faces of the parent metals are melted at a suitable rate to form a molten metal pool, which will positionally shift upward, while carrying the molten slag layer on the top and solidifying from the bottom thereof to form a deposited metal 8.

The welding electrode 7 is in the form of a thin ribbon and wound on a reel 9. The welding electrode being unwound from the reel 9 has a curling nature, which is cured by rolls 10 before said welding electrode is fed into the groove.

The rollers 10 are driven by a motor 11 and the feeding rate of the welding electrode is determined by the rotational speed of said rolls. The weld penetration in the parent metals being welded is subjected to the influence of welding voltage. For maintaining the welding voltage constant, it becomes necessary to control the feeding rate of the welding electrode and to this end, a controller 16 is provided to control the rotation of the motor 11.

A consumable guide 12 is disposed in the groove so as to prevent electric shorting by keeping the ribbon-like welding electrode 7 out of contact with the groove faces during travel of said welding electrode within the groove. This consumable guide is connected to a holder 13 fixed to the welding machine, and is secured relatively centrally of the groove by means of solid pieces of flux 14. Reference numeral 15 designates a power transformer.

Figure 2:
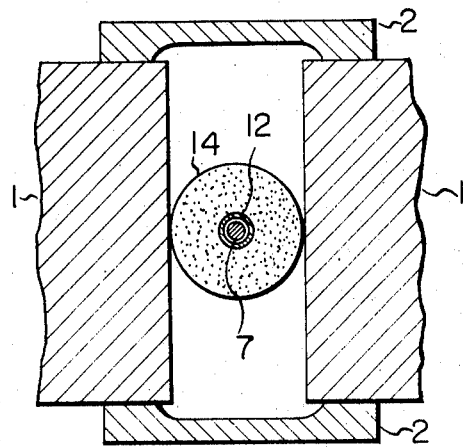
FIG. 2 is a plan view showing the set position of a welding electrode in a conventional method.
Figure 3:
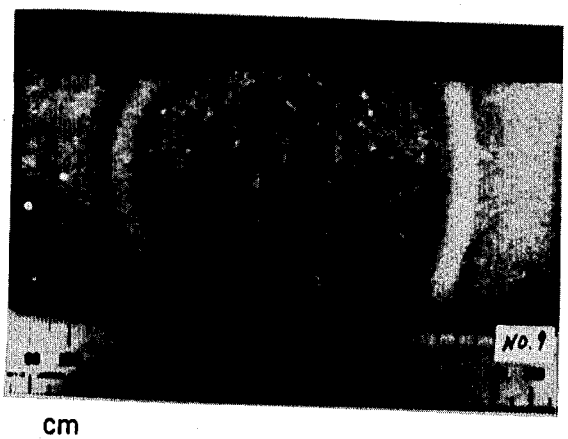
FIG. 3 is a macroscopic photograph showing the structure of the weld zone obtained with the welding electrode set in the position shown in FIG. 2.
Figure 5:
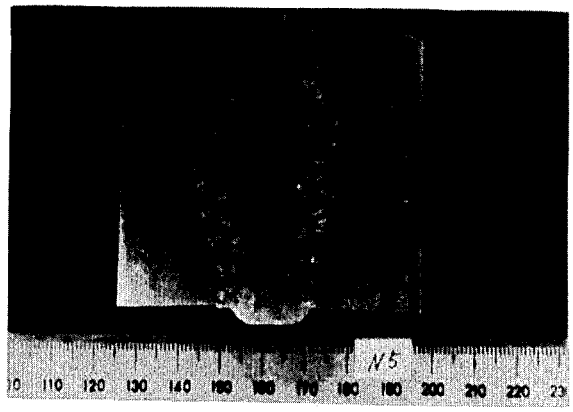
FIG. 5 is a macroscopic photograph showing the structure of the weld zone obtained with the welding electrode set in the position shown in FIG. 4.
Figure 4:
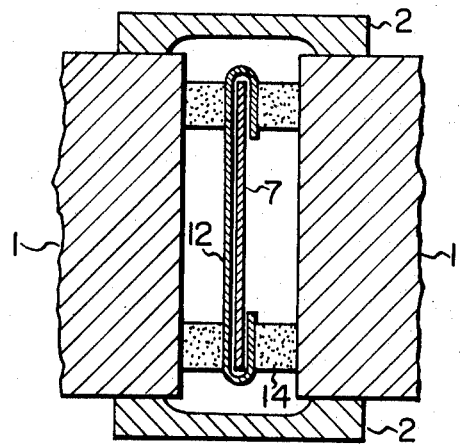
FIG. 4 is a plan view showing the set position of a welding electrode in the method of this invention.

In the conventional electroslag welding using a wire electrode, and wire electrode has been set in the groove in the manner shown in FIG. 2. With the wire electrode set in such a manner, the weld penetration in the parent metal is not uniform and has the shape as shown in FIG. 3. In the method of the present invention, however, it is possible to arrange the welding electrode over the enitre plate thickness of the parent metals as seen in FIG. 4, so that the temperature distribution in the molten slag becomes uniform in the thickness-wise direction of the parent metals and as a result, a weld penetration of the shape as shown in FIG. 5 can be obtained.

Figure 6:
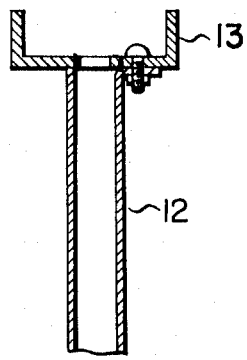
FIG. 6 is a side view showing a consumable guide mounting structure.

In the present invention, the holder is used to support the consumable guide extending in the groove, as stated above. The consumable guide is connected to the holder in the manner shown in FIG. 6.

Figure 7:
FIGS. 7 to 9 are cross sectional plan views respectively showing the shapes of consumable guides.
Figure 8:
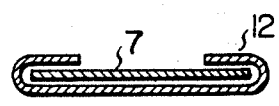
Figure 9:
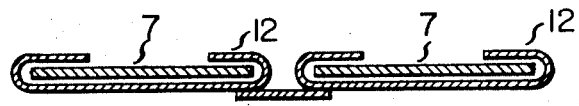

The consumable guide for guiding the ribbon-like welding electrode must be of a configuration capable of keeping said welding electrode out of contact with the groove faces. FIG. 7 shows one form of the consumable guide which completely encloses the welding electrode and FIG. 8 shows another form in which the welding electrode is partially exposed. Where the plate thickness of the parent metals is extremely large, the plate width of the welding electrode must also be made large for obtaining uniform weld penetration. However, it is disadvantageous economically to produce a ribbon-like electrode for each of parent metals, the plate thickness of which is variable. In such a case, it is only necessary to join a plurality of the consumable guides, as shown in FIG. 9 to make the total length of said consumable guides substantially equal to the plate thickness of the parent metals and thereby to achieve thermal balance. In this way, it is possible to obviate the economical disadvantage that a welding electrode must be made for conformance with the plate thickness of given parent metals at each time.

Figure 10:
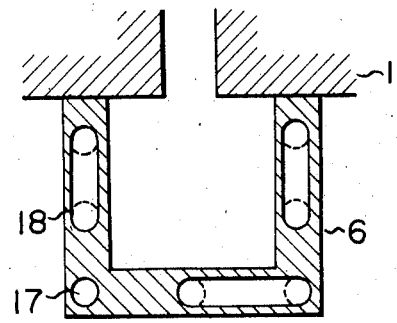
FIG. 10 is a cross sectional side view showing the construction of a tub.

The tub used at the start of welding should be made of copper and of a water-cooled structure, and an example thereof is shown in FIG. 10. In this example, a copper-made tab 6 is formed therein with a plurality of openings 17 which are communicated with each other by hoses 18, so that water may be circulated through said holes. It is preferable that the cavity of the tab 6 is larger in width than the groove, so as to obtain a sufficient parent metal preheating effect and to increase the resistance heat generated in the molten slag.

EXAMPLE 1

Figure 11:
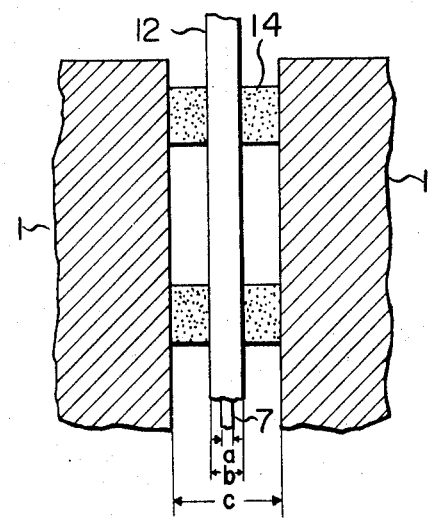
FIG. 11 is a side view showing the position of the welding electrode set in the groove formed by the parent metals.

An electroslag welding was carried out, with a welding electrode set in the groove as shown in FIG. 11 and a copper tab of the structure shown in FIG. 10.

The parent metals used were composed of 0.19 percent by weight of C, 0.02 percent by weight of Si, 0.13 percent by weight of Mn, 0.009 percent by weight of P, 0.024 percent by weight of S and the remainder of Fe, and has a plate thickness of 65 mm. The ribbon-like welding electrode was composed of 0.10 percent by weight of C, 0.31 percent by weight of Si, 0.92 percent by weight of Mn, 0.016 percent by weight of P, 0.007 percent by weight of S and the remainder of Fe, and had a plate thickness of 60 mm and a width (a) of 0.6 mm.

The consumable guide was made of the same material as the welding electrode and had a shape as shown in FIG. 8. The outer width (b) of the consumable guide was 3 mm and the groove width (c) was 13 mm. The welding was performed with a current of 30 V and 900 A.

As a result, the weld penetration was substantially uniform over the entire plate thickness of the parent metals and the width of the deposited metal was about 25 mm. No cracks were observed in the deposited metal. After welding, the weld zone showed a tensile strength of 43 kg/mm$^2$ and an impact strength of 5 kg-m/cm$^2$ in a 2 mm V-notch Charpy impact testing.

EXAMPLE 2

An electroslag welding was carried out using the same parent metals, welding electrode and consumable guide as in but under different welding conditions from Example 1.

Table 1 given below shows the welding conditions and appearances of the beads.

TABLE 1

| Run No. | Groove clearance (mm) | Voltage (V) | Amperage (A) | Welding rate (m/h) | Specific input heat ×10⁵ (J/cm²) | Appearance of bead |
|---|---|---|---|---|---|---|
| 1 | 10 | 30 | 650 | 2.5 | 0.45 | Insufficient penetration |
| 2 | 13 | 35 | 600 | 1.8 | 0.70 | Good |
| 3 | 15 | 35 | 600 | 1.6 | 0.75 | Good |

As seen in Table 1, an insifficient penetration resulted when the groove clearance was 10 mm, but a satisfactory penetration was obtained when the groove clearance was 13 mm or larger.

When the groove clearance was 13 mm, the welding rate was 1.8 m/h which is more than twice higher than the welding rate (about 0.8 m/h) with the conventional wire electrode. The microstructure of the weld zone, obtained when the groove clearance was 13 mm, in a cross section through the center of said weld zone and perpendicular to the welding direction, is shown in FIG. 5.

Figure 12:
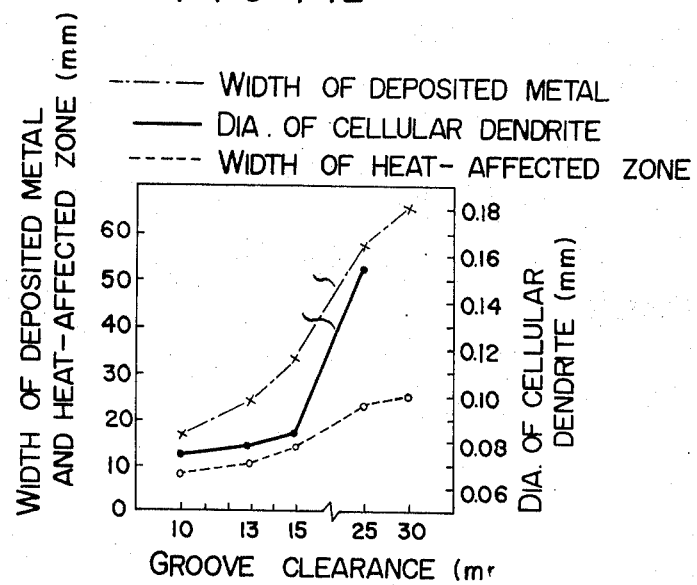
FIG. 12 is a graph illustrating the weld penetration and cellular dendrite diameter changing with the groove width.

The width of the deposited metal, the width of the heat-affected portion and the diameter of the cellular dendrite were as shown in FIG. 12. In FIG. 12, the values for the groove clearances of 25 mm and 30 mm are those obtained when a wire electrode was used.

It will be understood from FIG. 12 that the width of deposited metal, and the width of heat-affected portion become smaller with the groove clearance and particularly, the diameter of cellular dendrite is reduced remarkably. This brings about good results in the improvement of the mechanical strengths of the weld zone and in the minimization of high temperature cracks and deformation of the same.

Figure 13:
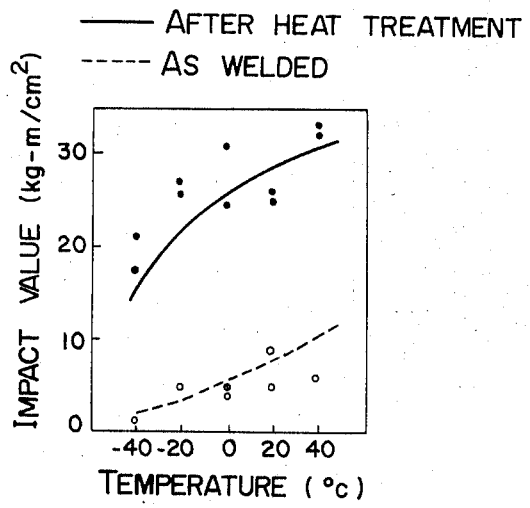
FIG. 13 is a graph showing the impact test results of the deposited metal.

FIG. 13 shows the impact value of the deposited metal obtained when the groove clearance was 13 mm. It will be seen that the deposited metal at 0°C. shows an impact value of about 25 kg-m/cm² after it has been normalized (900°C. × 3 h, air-cooling) and then tempered (625°C. × 3 h, air-cooling), and an impact value of kg-m/cm² or larger even as welded.

According to the present invention, an electroslag welding can be carried out with a narrower groove than heretofore as stated herein and, therefore, there can be achieved many advantages, such as improvement of the properties of the deposited metal, alleviation of deformation of the parent metals and improvement of the welding operation efficiency.

What is claimed is:

1. In a method for electroslag welding a pair of metal members which are connected to one terminal of a power source and are spaced apart to define a space therebetween, said method comprising guiding a consumable welding electrode into the space substantially centrally thereof through a consumable guide enclosing the electrode, said electrode being connected to the other terminal of the power source whereby the electrode, the guide and a part of the metal members are melted to form a molten metal pool, the improvement including utilizing the electrode in the form of a wide ribbon, the cross-sectional area thereof being sufficient to pass an amount of current sufficient to effect welding, and including securing the guide to the spaced surfaces of the metal members by means of solid pieces of flux so as to define the space of a width from 10mm to 30mm between the metal members, the guide enclosing the electrode in angularly spaced relation thereto.

2. In a method for electroslag welding a pair of metal members which are connected to one terminal of a power source and are spaced apart to define a space therebetween, said method comprising guiding a consumable welding electrode into the space substantially centrally thereof through a consumable guide enclosing the electrode, said electrode being connected to the other terminal of the power source whereby the electrode, the guide and a part of the metal members are melted to form a molten metal pool, the improvement including utilizing the electrode in the form of a wide ribbon, the cross-sectional area thereof being sufficient to pass an amount of current sufficient to effect welding, and including winding said electrode on a reel and feeding said electrode from the reel through the consumable guide, electrically connecting the guide to the electrode, and securing the guide to the spaced surfaces of the metal members by means of solid pieces of flux so as to define the space of a width from 10mm to 30mm between the metal members, the guide enclosing the electrode in angularly spaced relation thereto.

3. An electroslag welding method as defined in claim 2, including providing said consumable guide with a width substantially equal to the plate thickness of the metal members.

4. An electroslag welding method as defined in claim 2, including forming said consumable guide of a plurality of pieces joined together so as to provide said consumable guide with a width substantially equal to the plate thickness of the metal members.

5. An electroslag welding method as defined in claim 1, including detachably connecting a water-cooled copper tub to the metal members at the bottom end of the defined space therebetween.

6. In a method of electroslag welding wherein a pair of vertically positioned and spaced metal workpieces are welded together, the pair of workpieces having one terminal of a power source connected thereto and the other terminal of the power source being connected to a consumable welding electrode which is fed into the space between the metal workpieces substantially centrally thereof through a consumable guide enclosing the electrode such that the electrode, the guide and a portion of the metal workpieces are melted to form a molten metal pool within the defined space, the improvement comprising utilizing the consumable welding electrode having the shape of a wide ribbon and having a cross-sectional area sufficient to pass an amount of current to effect welding, positioning the consumable guide within the defined space by securing solid pieces of flux to the guide and the spaced workpieces, and feeding the electrode essentially vertically downwardly through the consumable guide positioned within the defined space between the metal workpieces.

7. In a method of electroslag welding wherein a pair of vertically positioned and spaced metal workpieces are welded together, the pair of workpieces having one terminal of power source connected thereto and the other terminal of the power source being connected to a consumable welding electrode which is fed into the space between the metal workpieces substantially centrally thereof through a consumable guide enclosing the electrode such that the electrode, the guide and a portion of the metal workpieces are melted to form a molten metal pool within the defined space, the improvement comprising separating the workpieces by a spacing of between 10–30mm, utilizing the consumable welding electrode having the shape of a wide ribbon and having a cross-sectional area sufficient to pass an amount of current to effect welding, feeding the electrode essentially vertically downwardly through the consumable guide positioned within the defined space between the metal workpieces, and effecting welding therein.

8. An electroslag welding method as defined in claim 6, including the step of arranging the solid pieces of flux to define a spacing between the metal workpieces in the range of 10–30mm.

9. An electroslag welding method as defined in claim 6, including the step of arranging the solid pieces of flux to define a spacing between the metal workpieces in the range of 10–25mm.

10. An electroslag welding method as defined in claim 6, including the step of arranging the solid pieces of flux to define a spacing between the metal workpieces in the range of 10–20mm.

11. In a method of electroslag welding wherein a pair of vertically positioned and spaced metal workpieces are welded together, the pair of workpieces having one terminal of a power source connected thereto and the other terminal of the power source being connected to a consumable welding electrode which is fed into the space between the metal workpieces substantially centrally thereof through a consumable guide enclosing the electrode such that the electrode, the guide and a portion of the metal workpieces are melted to form a molten metal pool within the defined space, the improvement comprising utilizing the consumable welding electrode having the shape of a wide ribbon and having a cross-sectional area sufficient to pass an amount of current to effect welding, providing the consumable guide with a width substantially equal to the plate thickness of the metal workpieces, and feeding the electrode essentially vertically downwardly through the consumable guide positioned within the defined space between the metal workpieces.

12. In a method of electroslag welding wherein a pair of vertically positioned and spaced metal workpieces are welded together, the pair of workpieces having one terminal of a power source connected thereto and the other terminal of the power source being connected to a consumable welding electrode which is fed into the space between the metal workpieces substantially centrally thereof through a consumable guide enclosing the electrode such that the electrode, the guide and a portion of the metal workpieces are melted to form a molten metal pool within the defined space, the improvement comprising utilizing the consumable welding electrode having the shape of a wide ribbon and having a cross-sectional area sufficient to pass an amount of current to effect welding, feeding the electrode essentially vertically downwardly through the consumable guide positioned within the defined space between the metal workpieces, and including the step of forming the consumable guide of a plurality of pieces joined together so as to provide the consumable guide with a width substantially equal to the plate thickness of the metal workpieces, each of the pieces enclosing a separate ribbon electrode fed therethrough.

13. An electroslag welding method as defined in claim 6, including the step of detachably connecting a water-cooled copper tub to the metal workpieces at the lower end of the defined space between the metal workpieces.

* * * * *